US010185445B2

(12) United States Patent
Li et al.

(10) Patent No.: US 10,185,445 B2
(45) Date of Patent: Jan. 22, 2019

(54) DETERMINING TOUCH SIGNALS FROM INTERACTIONS WITH A REFERENCE PLANE PROXIMATE TO A DISPLAY SURFACE

(71) Applicant: TouchJet Pte. Ltd., Singapore (SG)

(72) Inventors: Jiang Li, Singapore (SG); Zhen Liu, Auckland (NZ)

(73) Assignee: TouchJet Pte. Ltd., Singapore (SG)

( * ) Notice: Subject to any disclaimer, the term of this patent is extended or adjusted under 35 U.S.C. 154(b) by 0 days.

(21) Appl. No.: 14/723,088

(22) Filed: May 27, 2015

(65) Prior Publication Data

US 2015/0253929 A1 Sep. 10, 2015

Related U.S. Application Data

(63) Continuation-in-part of application No. 14/514,367, filed on Oct. 14, 2014.

(30) Foreign Application Priority Data

Oct. 14, 2013 (CN) .................. 2013 2 0634347 U
Apr. 4, 2014 (CN) ..................... 2014 1 0138790

(51) Int. Cl.
*G06F 3/03* (2006.01)
*H04N 9/31* (2006.01)
(Continued)

(52) U.S. Cl.
CPC ........... *G06F 3/0421* (2013.01); *G03B 17/54* (2013.01); *G06F 3/0304* (2013.01);
(Continued)

(58) Field of Classification Search
CPC ... G06F 3/0421; G06F 3/03545; G06F 3/0354
See application file for complete search history.

(56) References Cited

U.S. PATENT DOCUMENTS 5,489,923 A 2/1996 Marshall et al.
6,275,214 B1 8/2001 Hansen
(Continued)

OTHER PUBLICATIONS

United States Office Action, U.S. Appl. No. 14/514,367, dated May 10, 2016, 20 pages.
(Continued)

*Primary Examiner* — Priyank J Shah
(74) *Attorney, Agent, or Firm* — Fenwick & West LLP

(57) ABSTRACT

A reference plane generating unit generates a reference plane of light parallel to a display surface. For example, the reference plane generating unit projects a plane of infrared light parallel to a plane including the display surface. When a pointer, such as a stylus or a finger, breaks the reference plane, light is reflected from the reference plane, with at least a portion of the reflected light directed toward an image capturing unit. Based on the reflected light captured by the image capturing unit, the image processing unit determines a position of the pointer in the reference plane and determines a touch signal corresponding to the determined position of the pointer. The touch signal is communicated to a processing unit, such as a mobile device, that performs an operation corresponding to the determined touch signal.

15 Claims, 5 Drawing Sheets

(51) Int. Cl.
  *G03B 17/54* (2006.01)
  *G06F 3/042* (2006.01)
  *H04N 5/33* (2006.01)
(52) U.S. Cl.
  CPC .............. *G06F 3/0425* (2013.01); *H04N 5/33* (2013.01); *H04N 5/332* (2013.01); *H04N 9/3173* (2013.01)

(56) References Cited

U.S. PATENT DOCUMENTS

| | | | | |
|---|---|---|---|---|
| 6,803,906 | B1* | 10/2004 | Morrison | G06F 3/0428 178/18.01 |
| 8,041,399 | B2* | 10/2011 | Jarczyk | H04N 9/3141 455/556.1 |
| 2001/0030642 | A1* | 10/2001 | Sullivan | G06F 3/0421 345/157 |
| 2002/0118151 | A1* | 8/2002 | Chen | G06F 1/1616 345/84 |
| 2009/0146972 | A1 | 6/2009 | Morrison et al. | |
| 2012/0287443 | A1* | 11/2012 | Lin | G06F 3/0421 356/622 |
| 2013/0342704 | A1 | 12/2013 | Williams et al. | |
| 2014/0176433 | A1 | 6/2014 | Huang | |
| 2014/0313166 | A1* | 10/2014 | Rattray | H04N 9/3179 345/175 |
| 2014/0354536 | A1* | 12/2014 | Kim | G06F 3/017 345/156 |
| 2016/0054859 | A1* | 2/2016 | Oshima | G06F 3/0425 345/175 |

OTHER PUBLICATIONS

United States Office Action, U.S. Appl. No. 14/514,367, dated Oct. 27, 2016, 22 pages.
United States Advisory Action, U.S. Appl. No. 14/514,367, dated Feb. 3, 2017, 5 pages.

* cited by examiner

DETERMINING TOUCH SIGNALS FROM INTERACTIONS WITH A REFERENCE PLANE PROXIMATE TO A DISPLAY SURFACE

CROSS REFERENCE TO RELATED APPLICATIONS

This application is a continuation-in-part of co-pending U.S. patent application Ser. No. 14/514,367, filed Oct. 14, 2014, which claims the right of priority based on Chinese Application Serial No. 201320634347.2, filed Oct. 14, 2013, and based on Chinese Patent Application No. 201410138790.X, filed Apr. 4, 2014, each of which is incorporated by reference in its entirety.

BACKGROUND

This invention relates to human-machine interacting technology, and more particularly to a projector with touch functionality.

Devices providing touchscreen functionality have become increasingly popular as devices have become increasingly portable. Many client devices, such as mobile computing devices, includes display devices having a touch screen. Allowing the display devices to be larger and the client devices to be smaller. A display device having a touch screen comprises a display panel with a touch screen positioned above the display panel to receive touch inputs from a user. Example types of touch screens include: resistive touch screens, capacitive touch screens, infrared touch screens, and surface acoustic touch screens. Resistive touch screens and capacitive touch screens are more commonly used in conventional client devices. However, resistive touch screens and capacitive touch screens use a sensing circuit on the display panel, adding complexity to their structure and manufacturing.

Additionally, display devices included in certain types of devices, such as projectors or television sets having relatively large sized display devices are also frequently used. Many devices with large display devices do not need complex and accurate touch operations, and instead provide a limited number of simile human-machine interaction functions. Augmenting these devices with conventionally used touch screen display devices would significantly increase the cost of these devices.

SUMMARY

To allow various display devices to present content and also receive touch-based inputs, an image capturing unit is positioned to have a field of view including a display surface. In some embodiments, the field of view of the image capturing unit (e.g. a camera) includes an entirety of the display surface. In various embodiments, the display surface is a projection screen of a projector or a display device, such as a monitor or a television set. A light-spot emitting unit emits light that forms at least one light spot on the display surface. The image capturing unit captures an image of a light spot on the display surface or captures a series of images of the light spot on the display surface at different times, allowing the series of images to identify a trajectory of the light spot on the display surface. In various embodiments, the light-emitting unit emits infrared light and the image capturing unit is an infrared camera.

An image processing unit is coupled to the image capturing unit and receives the image or series of images of the light spot on the display surface. From the image or the series of images, the image processing unit generates a touch signal. The touch signal generated by the image processing unit is based on a trajectory of the light spot on the display surface from the series of images or a position of the light spot on the display surface from an image. A processing unit receives the touch signal generated by the image processing unit and performs an operation associated with the touch signal. For example, the processing unit executes an operating system, such as ANDROID™, that associates one or more operations with one or more touch signals. When the processing unit receives a touch signal from the image processing unit, the processing unit identifies an operation associated with the touch signal and performs the identified operation. In some embodiments, the display surface presents image frames corresponding to display signals generated by the processing unit. For example, the display surface is a display device (e.g., a monitor, a projector, a television set, etc.) separate from the processing unit and the image processing unit that receives display signals from the processing unit and presents image frames corresponding to the display signals. Alternatively, a display device includes the processing unit and the image processing unit; the display device then generates image frames for presentation on the display surface based on display signals from the processing unit.

In some embodiments, a display device providing image frames for presentation on the display surface includes a display device support. If the display device is a projector, the display device support is coupled to a projection screen onto which the projector presents image frames; however, if the display device is a monitor or television set, the display device support is coupled to the monitor or to the television set. In some embodiments, the display device support is detachably coupled to the display device, allowing the display device support to be removed from the display device. The image capturing unit may be coupled to the display device support and positioned so the field of view of the image capturing unit includes the display surface. In some embodiments, the image capturing unit is detachably mounted to the display device support.

Hence, one or more images of the display surface is captured, with at least one of the captured images including a light spot generated by the light-spot emitting unit on the display surface. An image processing unit converts images including the light spot into one or more touch signals. A processing unit receives one or more of the touch signals and performs one or more operations corresponding to the one or more touch signals. This allows interaction with the display surface using the light spot to perform operations corresponding to touch signals, enabling the display surface to provide touch screen functionality.

In other embodiments, a reference plane generating unit generates a reference plane parallel to the display surface. For example, the reference plane generating unit projects a plane of infrared light parallel to a plane including the display surface. The reference plane is at least a threshold distance from the display surface (e.g., 2 millimeters from the display surface). In some embodiments, the reference plane generating unit is detachably coupled to a display device including the display surface or is detachably coupled to a device that presents image frames from a display device (e.g., a projector screen onto which a projector displays image frames).

When a pointer, such a stylus or a finger, breaks the reference plane, light is reflected from the reference plane, with at least a portion of the reflected light directed toward the image capturing unit. Based on the reflected light captured by the image capturing unit, the image processing unit determines a position of the pointer in the reference plane and determines a touch signal corresponding to the determined position of the pointer. In some embodiments, the image processing unit determines a trajectory of the pointer in the reference plane based on reflected light captured by the image capturing unit at different times; based on the trajectory of the pointer in the reference plane, the image processing unit determines a touch signal. The image processing unit communicates the touch signal to the processing unit, which performs an operation corresponding to the touch signal.

Alternatively, a projector includes a projection assembly and a driving board coupled to the projection assembly. Additionally, the projector includes a photoelectric touch assembly including a light-spot emitting unit, an image capturing unit, an image processing unit and a processing unit. The light-spot emitting unit emits light, such as infrared light, that forms at least one light spot on a projection screen of the projector. The image capturing unit has a field of view including the entirety of the projection screen and captures an image of a light spot on the projection screen or a series of image of the light spot on the projection screen. In some embodiments, the image capturing unit is an infrared camera. The image processing unit receives the image or series of images of the light spot form the image capturing unit and identifies a touch signal associated with a position of the light spot from the image or associated with a trajectory of the light spot from the series of images.

The processing unit executes an operating system or application that associates operations with touch signals. For example, the processing unit executes ANDROID™. The processing unit is coupled to the image processing unit and to the driving board. When the processing unit receives a touch signal from the image processing unit, the processing unit identifies an operation associated with the touch signal and executes the identified operation. If the identified operation modifies image data, the processing unit communicates with the driving board to modify an image frame displayed on the projection screen by the projection assembly.

In some embodiments, the projector includes a housing that includes the image capturing unit, the image processing unit, the processing unit, the projector assembly, and the driving board. Additionally, the projector may include a multi-interface unit connected to the driving board and to one or more external components. Image data may be communicated from an external component to the driving board for presentation by the projection assembly via the multi-interface unit.

Additionally, the projector includes a power supply interface and a power supply processing unit in some embodiments. The power supply processing unit is coupled to the projection assembly, to the driving board, to the image capturing unit, to the image processing unit, and to the processing unit. Further, the power supply interface is coupled to the power supply processing unit to provide power from an external source to the components' coupled to the power supply processing unit. Alternatively, the projector includes a power supply that is coupled to the power supply processing unit to provide power to the components of the projector. In some embodiments, the power supply included in the projector is a battery, which may be a chargeable battery capable of receiving and storing power from an external source coupled to the battery.

In some embodiments, the projector also includes a reference plane generating that generates a reference plane parallel to the projection screen. For example, the reference plane generating unit projects a plane of infrared light parallel to a plane including the projection screen at least a threshold distance from the projection screen. In some embodiments, the reference plane generating unit is detachably coupled to the projection screen. Alternatively, the reference plane generating unit is a separate device that is positioned relative to the projection screen.

When a pointer, such a stylus or a finger, breaks the reference plane, light is reflected from the reference plane and at least a portion of the reflected light directed toward the image capturing unit of the projector. Based on the reflected light captured by the image capturing unit, the image processing unit determines a position of the pointer in the reference plane and determines a touch signal corresponding to the determined position of the pointer. In some embodiments, the image processing unit determines a trajectory of the pointer in the reference plane based on reflected light captured by the image capturing unit at different times; based on the trajectory of the pointer in the reference plane, the image processing unit determines a touch signal. The image processing unit communicates the touch signal to the processing unit, which performs an operation corresponding to the touch signal.

Other objectives, features and advantages of the present invention will be further understood from the further technological features disclosed by the embodiments of the present invention wherein there are shown and described preferred embodiments of this invention, simply by way of illustration of modes best suited to carry out the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
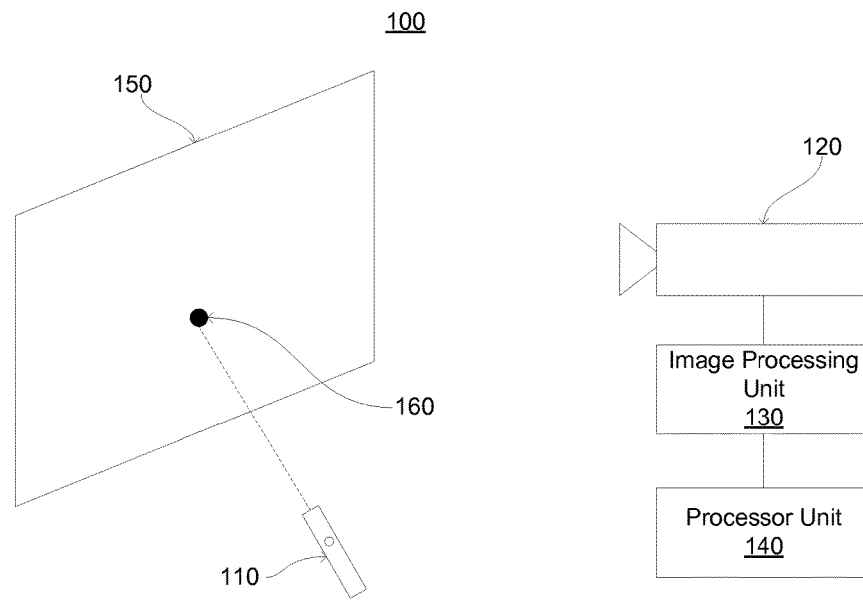
FIG. 1 is a high-level block diagram of a photoelectric touch assembly, according to one embodiment of the present disclosure.

FIG. 1 is a block diagram of one embodiment of a photoelectric touch assembly 100. In the example of FIG. 1, the photoelectric touch assembly 100 includes a light-spot emitting unit 110, an image capturing unit 120, an image processing unit 130 and processing unit 140. However, in other embodiments, the photoelectric touch assembly 100 may include different and/or additional components.

The light-spot emitting unit 110 is configured to emit light for forming at least one light spot 160 on a display surface 150. In various embodiments, the light-spot emitting unit 110 emits infrared light. For example, the light-spot emitting unit 110 is an infrared pen or infrared pointing device. However, in other embodiments, the light-spot emitting unit 110 is any suitable device configured to emit one or more wavelengths of light.

The image capturing unit 120 is positioned so that a field of view of the image capturing unit 120 includes the display surface 150. In some embodiments, the image capturing unit 120 is positioned so its field of view includes the entirety of the display surface 150. Alternatively, the image capturing unit 120 is positioned so its field of view includes at least a threshold percentage or amount of the display surface 150. The image capturing unit captures images of the display surface 150, with one or more of the images including the light spot 160. For example, the image capturing unit 120 captures a series of images of the display surface 150 that include the light spot 160 at different positions of the display surface 150; hence, the series of images of the display surface 150 describe a trajectory of the light spot 160 across the display surface 150 over time. In some embodiments, the image capturing unit 120 is an infrared camera.

Images captured by the image capturing unit 120 are communicated to the image processing unit 130. From the images, the image processing unit 130 identifies a position of the light spot 160 or a trajectory of the light spot 160 and determines a touch signal corresponding to the position of the light spot 160 or the trajectory of the light spot 160. The processing unit 140 is coupled to the image processing unit 130, receives the touch signal determined by the image processing unit 130 and performs an operation corresponding to the touch signal. In some embodiments, the processing unit 140 is a device executing an operating system that performs operations corresponding to one or more touch signals. For example, the processing unit 140 is a device executing an ANDROID™ operating system that associates operations with various touch signals. In some embodiments, the processing unit 140 is a device including a touch screen (e.g., a smartphone, a tablet computer, etc.). In other embodiments, the processing unit 140 does not include a touch screen.

In some embodiments, the display surface 150 is a projection screen of a projector. Alternatively, the display surface 140 is a display device, such as a monitor or a television set. The projector or monitor may be coupled to the processing unit 140 and display image frames corresponding to display signals of processing unit 140 on the display surface 150.

Hence, a user positions the light-spot emitting unit 110 so the light-spot emitting unit 110 projects the light spot 160 onto the display surface 150. The user may reposition the light-spot emitting unit 110 to move the light spot 16 in a trajectory across the display surface 150. The image capturing unit 120 captures images of the display surface 150, where one or more of the images includes the light spot 160. Images captured by the image capturing unit 120 are communicated to the image processing unit 130, which determines a touch signal corresponding to a position or a trajectory of the light spot 160 on the display surface 150 based on one or more images including the light spot 160. The image processing unit 130 communicates the determined touch signal to the processing unit 140, which performs an operation corresponding to the touch signal. For example, when the display surface 150 displays an image frame from the processing unit 140, the user positions the light-spot emitting unit 110 to project the light spot 160 onto a portion of the displayed image frame, such as a portion of the displayed image frame including a command to display a menu or to display another image frame. The image capturing unit 120 captures one or more images including the light spot 160 and the image frame displayed on the display surface 150, and the image processing unit 130 converts the one or more images from the image capturing unit 120 to a corresponding touch signal. The processing unit 140 receives the touch signal and performs an operation corresponding to the touch signal. In the preceding example, the processing unit 140 displays the menu or displays another image frame based on the portion of the displayed image frame onto which the light sport 160 is projected. As another example, the user moves the light spot 160 across the display surface 150, forming a trajectory. The image capturing unit 120 captures frames including the display surface 150 and the light spot 160 projected on the display surface 150, allowing the captured frames to identify a trajectory of the light spot 160 across the display surface 150. As described above, the image processing unit 130 determines a touch signal corresponding to the trajectory of the light spot 160 identified by the captured frames and communicates the determined touch signal to the processing unit 140, which performs an operation corresponding to the touch signal.

In various embodiments, the image capturing unit 120 is positioned in a plane parallel to a plane including the display surface 150. Additionally, the image capturing unit 120, the image processing unit 130, and the processing unit 140 may be integrated together, or various combinations of the image capturing unit 120, the image processing unit 130, and the processing unit 14 may be integrated together. In other embodiments, the image capturing unit 120, the image processing unit 130, and the processing unit 140 are independent from each other. The image capturing unit 120, the image processing unit 130, and the processing unit 140 may be conventional devices, such as a camera, an image processor and a mobile phone, respectively, communicatively coupled to each other via cables or via a wireless connection.

The image capturing unit 120, the image processing unit 130, and the processing unit 140 of the photoelectric touch assembly 100 may be independent from a display device (e.g., a projector, a television set, a monitor) presenting the display surface 150. This allows the photoelectric touch assembly 100 to be used with conventional display devices, augmenting a conventional display device with touch-screen functionality. Alternatively, one or more of the image capturing unit 120, the image processing unit 130, and the processing unit 140 of the photoelectric touch assembly 100 are integrated into the projector or the TV set.

Figure 2:
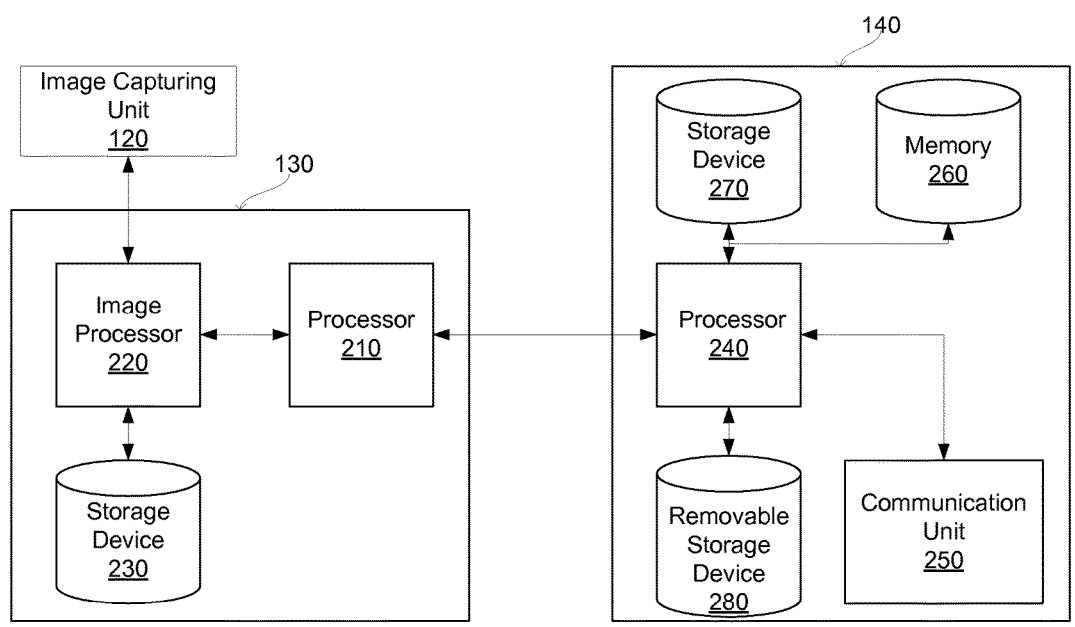
FIG. 2 is a block diagram of the photoelectric touch assembly shown in FIG. 1.

FIG. 2 shows a block diagram of one embodiment of the photoelectric touch assembly 100 shown in FIG. 1. In the example of FIG. 2, the image capturing unit 120 is an infrared camera, and the image processing unit 130 includes a processor 210, an image processor 220, and a storage device 230 (e.g., a solid-state drive, a flash memory). Additionally, the processing unit 140 shown in FIG. 2 includes a processor 240, a communication unit 250, a memory 260, and a storage device 270. In some embodiments, the processing unit 140 also includes a removable storage device 280, such as a secure digital card. In other embodiments, the image processing unit 130 or the processing unit 140 may include different and/or additional components than those described in conjunction with FIG. 2.

The image capturing unit 120 is coupled to the image processor 220 via a wireless or wired connection and receives control signals or instructions from the image processor 220 via the wireless or wired connection. Additionally, the image capturing unit 120 communicates captured image data to the image processor 220 via the wireless or wired connection. The image processor 220 is coupled to the processor 210 of the image processing unit 130, allowing the processor 210 to identify a touch signal from the image data received from the image capturing unit 120. Additionally, the image processor 220 is connected to a storage device 230, allowing the image processing unit 130 to store image data received from the image capturing unit 120.

Additionally, the processor 210 of the image processing unit 130 is coupled to the processor 240 of the processing unit 140 via a wireless or wired connection and communicates a touch signal identified by the processor 210 to the processor 240 for performing an operation corresponding to the identified touch signal. The processor 240 is also coupled to the memory 260 and to the storage device 270 of the image processing unit 140. In some embodiments, the processor 240 is also coupled to the removable storage device 280, which is included in the processing unit 140 or coupled to the processing unit 14. Additionally, the communication unit 250 is coupled to the processor 240 and transmits data generated by the processor 240 or receives data for use by the processor 240 via any suitable wireless or wired communication channel. Further, the processor 240 may include one or more interfaces for connecting the processor 240 to a display device (e.g., a projector, a monitor, a television set), allowing the processor 240 to communicate display signals or image data to the display device for presentation.

Figure 3:
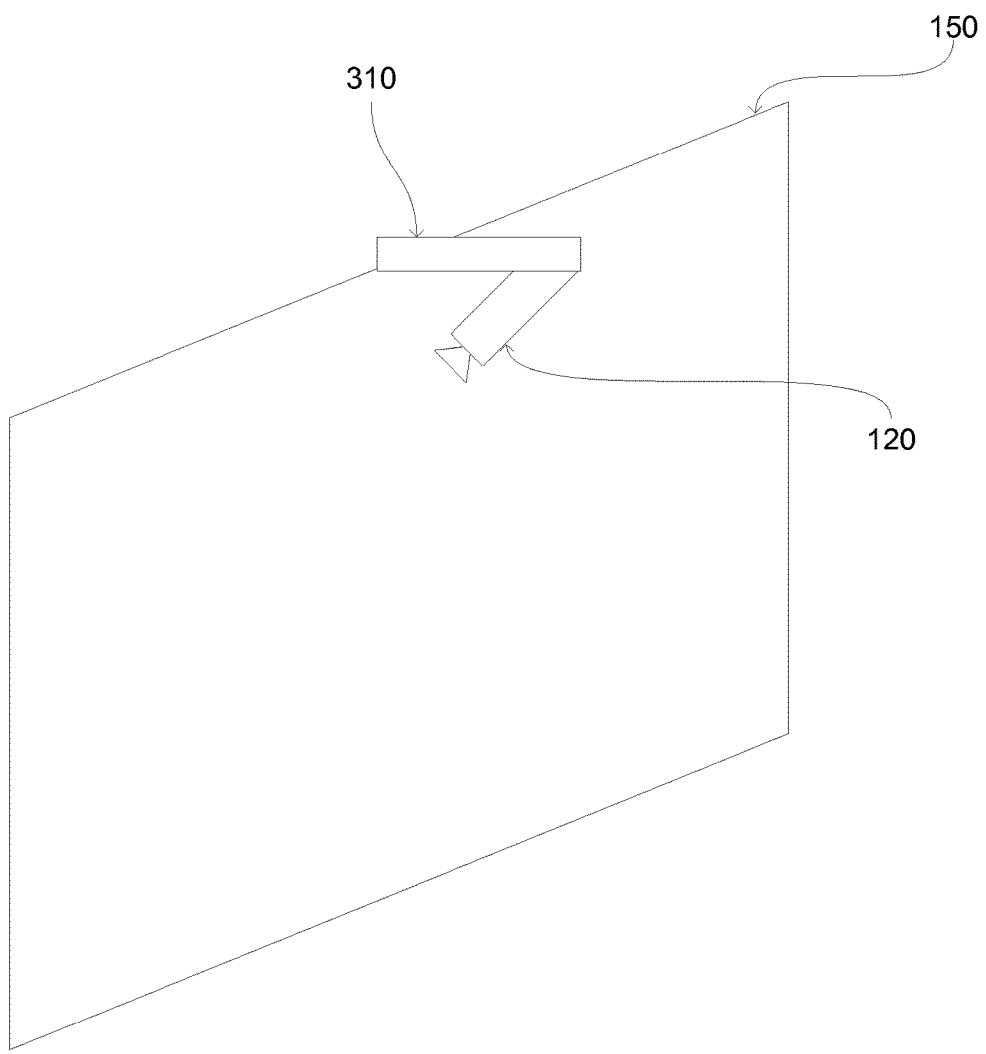
FIG. 3 is a block diagram of installation of an image capturing unit relative to a display surface, according to one embodiment of the present disclosure.

FIG. 3 shows an example orientation of the image capturing unit 120 relative to a display surface 150. For example, the display surface 150 is a display screen of a monitor or a television set. In the example of FIG. 3, the image capturing unit 120 is coupled to a support 310 that is also coupled to the display surface 150. The support 310 is coupled to the display surface 150 so the image capturing unit 120 is in a position relative to the display surface 150 so a field of view of the image capturing unit 120 includes at least a threshold portion of the display surface. For example, the support 310 is coupled to a frame of a display device (e.g., a monitor, a television set, a projector screen) including the display surface 150. In various embodiments, the support 310 is detachably coupled to the display surface 150. Similarly, the image capturing unit 120 may be also detachably mounted to the support 310. In other embodiments, the support 310 is foldable, allowing the support 310 to be folded up to conserve space when not in use.

Figure 4:
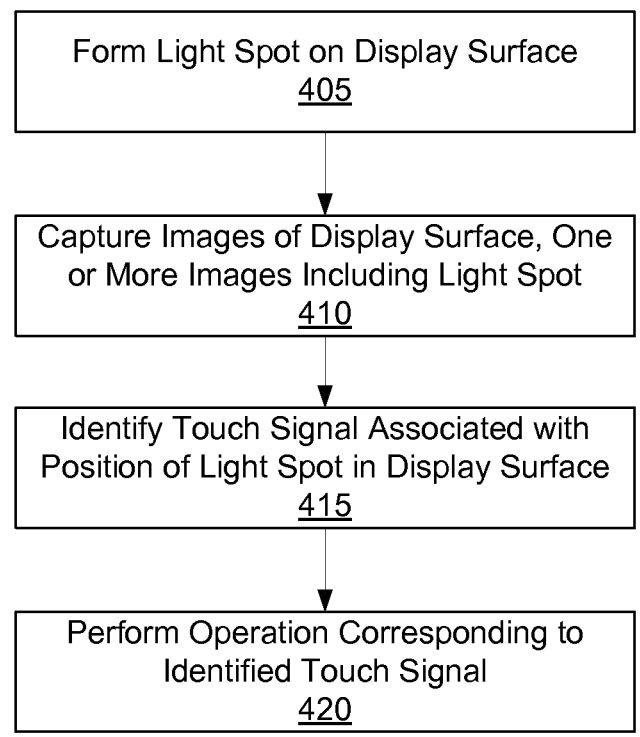
FIG. 4 is a flowchart of a method for performing operations corresponding to touch signals identified by interaction with a display surface, according to one embodiment of the present disclosure.

FIG. 4 shows an embodiment of a method for performing operations corresponding to touch signals identified by interaction with a display surface. In other embodiments, the method includes different and/or additional steps than those described in conjunction with FIG. 4. Additionally, steps of the method may be performed in different orders than the order described in conjunction with FIG. 4.

The light-spot emitting unit 110 is positioned to form 405 at least one light spot on a display surface 150. For example, the light-spot emitting unit 110 forms 405 a light spot on a portion of a monitor or of a projection screen. The light spot may traverse a trajectory across the display surface 150 based on movement of the light-spot emitting unit 110. In various embodiments, the light spot comprises infrared wavelengths of light in various embodiments. The image capturing unit 120 captures 410 one or more images of the display surface 150, with one or more of the images including the light spot. For example, the image capturing unit 120 is an infrared camera capturing images including the light spot in one or more positions of the display device 140. As described above, the image capturing unit 120 is positioned so a field of view of the image capturing unit 120 includes at least a threshold amount of the display surface 150.

Based on the one or more images captured by the image capturing unit 120, the image processing unit 130 identifies 415 a touch signal associated with a position or a trajectory of the light spot within the display surface 150. In some embodiments, the image processing unit 130 includes stored data associating positions or trajectories of the light spot within a display surface 140 with various touch signals. The image processing unit 130 compares a position or a trajectory of the light spot within the display surface 150 from the captured images to the stored data and identifies 415 a touch signal associated with a stored position or trajectory matching the position or the trajectory of the light spot within the display surface 150 from the captured images.

The processing unit 140 receives the identified touch signal from the image processing unit 130 and performs 420 an operation corresponding to the identified touch signal. In various embodiments, the processing unit 140 retrieves a command or an instruction associated with the touch signal and performs 430 the retrieved command or instruction. As another example, the processing unit 140 retrieves data associated with the touch signal and presents the retrieved data by communicating a display signal identifying the retrieved data to a display device. In various embodiments, the processing unit 140 compares the identified touch signal to stored data associating touch signals with operations and performs 420 an operation associated with a stored touch signal matching the identified touch signal.

Figure 5:
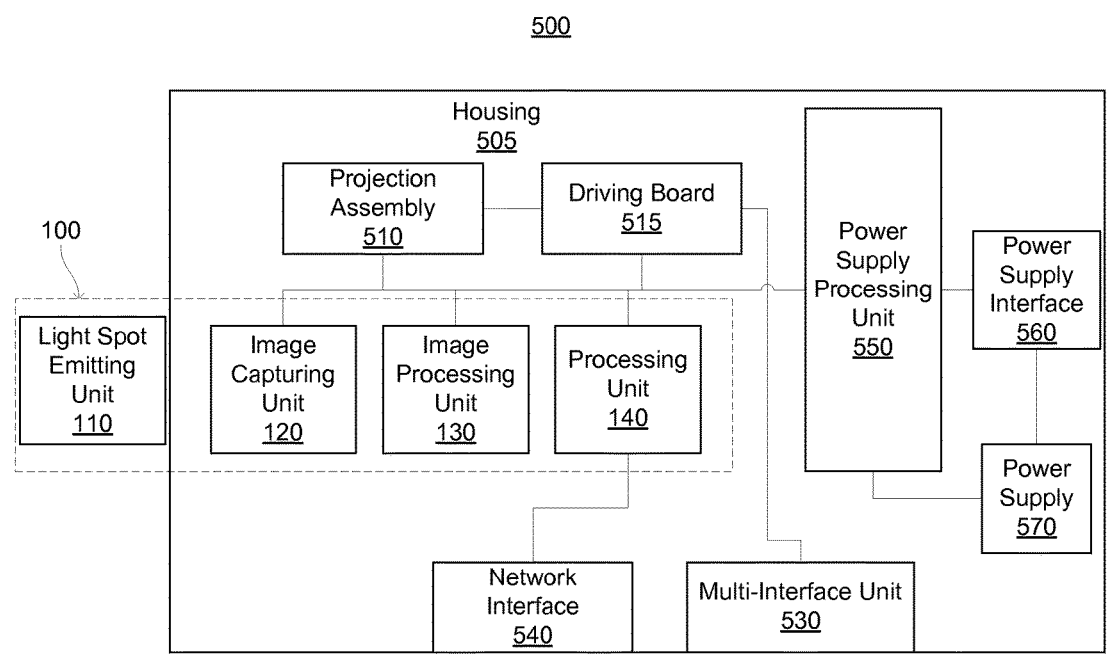
FIG. 5 is a block diagram of a projector including a photoelectric touch assembly, according to another embodiment of the present disclosure.

FIG. 5 shows a block diagram of one embodiment of a projector 500 including a photoelectric touch assembly. The projector 500 comprises a housing 505 including a projection assembly 510, a driving board 515, the photoelectric touch assembly 520, a multi-interface unit 530, and a network interface 540. Additionally, the housing 505 includes a power supply processing unit 550 and a power supply interface 560. In some embodiments, the housing 505 also includes a power supply 570.

The projection assembly 510 is coupled to the driving board 515, which provides control signals identifying image frames for projection onto a display surface 15 by the projection assembly 510. For example, the projection assembly 510 comprises a light source (e.g., a light emitting diode), a lens, a digital optical processing chip, and other components for projecting image frames. As further described above in conjunction with FIGS. 1 and 2, the photoelectric touch assembly 100 includes an image capturing unit 120, an image processing unit 130, a processing unit 140, and a light-spot emitting unit 110. While FIG. 5 shows an example where the image capturing unit 120, the image processing unit 130, and the processing unit 140 are included in the housing 505, in other embodiments, one or more of the image capturing unit 120, the image processing unit 130, and the processing unit 140 are external to the housing 505. For example, the processing unit 140 is external to the housing 505.

In some embodiments, the driving board 515 is coupled to the multi-interface unit 530, allowing an external device to be coupled to the multi-interface unit and communicate image data to the driving board 515 for presentation by the projection assembly 510. For example, the external device is a laptop computer, a smart phone, a tablet computer, or other suitable device. Additionally, the driving board 515 is coupled to the processing unit 140, allowing the driving board 515 to communicate image frames from an external device or from the processing unit 140 to the projection assembly 510 for presentation.

The network interface 540 is coupled to the processing unit 140, allowing information to be transmitted by or received by the processing unit 140 via one or more communication channels. For example, the network interface 540 connects the processing unit 140 to a network via a wireless or a wired connection, allowing the processing unit 140 to obtain data from various sources or to communicate data to various sources. In some embodiments, the projector 500 also includes a storage device or is coupled to a storage device that is connected to the processing unit 140, allowing storage of data to be processed by or generated by the processing unit 140.

Further, the projector 500 includes a power-supply processing unit 550 coupled to the projection assembly 510, to the driving board 515, to the image capturing unit 120, to the image processing unit 130, and to the processing unit 140. The power-supply interface 560 is coupled to the power-supply processing unit 550 and provides power to the power-supply processing unit 550, which allocates the power to other components of the projector. In some embodiments, such as the embodiment shown in FIG. 5, the housing 505 includes a power supply 570 that is coupled to the power supply interface 560; the power supply 570 may be recharged by connecting an external power source to the power supply interface 560. Alternatively, the power supply interface 560 is coupled to a power supply external to the projector 500.

Figure 6:
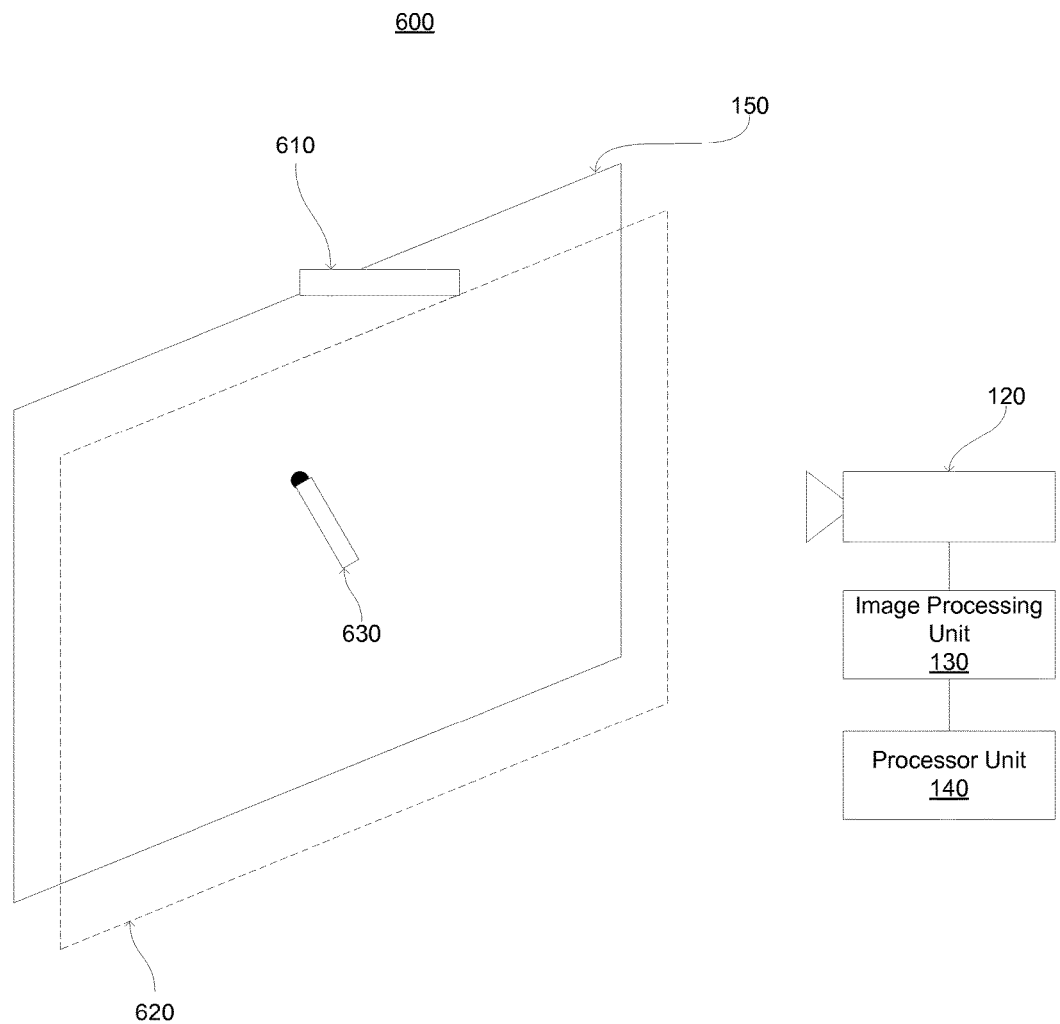
FIG. 6 is a high-level block diagram of an alternative implementation of a photoelectric touch assembly, according to one embodiment of the present disclosure.

FIG. 6 is a block diagram of an alternative embodiment of a photoelectric touch assembly 600. In the example of FIG. 6, the photoelectric touch assembly 600 includes a reference plane generation unit 610, a pointer 630, the image capturing unit 120, the image processing unit 130, and the processing unit 140. However, in other embodiments, the photoelectric touch assembly 600 may include different and/or additional components.

The reference plane generation unit 610 includes a coherent light source projecting light onto a diffractive optical element configured to generate and to project a reference plane 620 of light that is projected. In some embodiments, the reference plane generation unit 610 comprises a laser projecting light onto a lens or other diffractive element that diffuses the light from the laser to form a plane of light. For example, the laser in the reference plane generation unit emits light at an infrared wavelength, so the reference plane generation unit 610 generates and projects an infrared reference plane 620 of light. One or more dimensions of the reference plane 620 may be based on dimensions of the display surface 150. For example, a length and a width of the reference plane 620 equal a length and a width, respectively, of the display surface 150. In other examples, the length or width of the reference plane 620 exceed a corresponding dimension of the display surface 150. Additionally, the reference plane generation unit 610 is positioned relative to the display surface 150 so the reference plane 620 is projected within a threshold distance of the display surface 150. For example, the reference plane generation unit 610 is positioned so the reference plane 620 is projected within 2 millimeters of the display surface 150. In some embodiments, the reference plane generation unit 610 is attached to a display device (e.g., a projection screen, a monitor) including the display surface 150 where a position of the reference plane generation unit 610 relative to the display surface 150 may be modified. If the reference plane generation unit 610 is attached to the display device, the reference plane generation unit 610 may be removed from the display device.

When a pointer 630, such as stylus or a user's finger, breaks the reference plane 620, light is reflected from the reference plane 620 by the pointer 630. In various embodiments, the pointer 630 is any object capable of reflecting wavelengths of light projected by the reference plane generation unit 610. At least a portion of the reflected light is directed toward the image capturing unit 120, which captures images including the reflected light. In some embodiments, the image capturing unit 120 is an infrared camera or includes an infrared filter through which the reflected light passes before reaching an image processor. The image capturing unit 120 may a series of multiple images at different times including light from the reference plane 620 reflected toward the image capturing unit 120 at different times. Including an infrared filter in the image capture device 120 or using an infrared camera as the image capture device 120 when the reference plane 620 is infrared light allows the image capturing unit 120 to more accurately differentiate between light reflected from the reference plane 620 and light from image data presented by the display surface 150. As described above in conjunction with FIG. 1, the image capturing unit 120 is positioned so its field of view includes at least a threshold amount of the display surface 150 or includes the entirety of the display surface 150. Additionally, when the reference plane generation unit 610 is attached to a display device (e.g., a monitor, a television set, a projection screen), a calibration process is performed by the image capturing unit 120 when the photoelectric touch assembly 600 is initially configured. The calibration process allows the image capturing unit 120 to determine the position of the reference plane 620 relative to the image capturing unit 120, as the image capturing unit 120 and the reference plane generation unit 610 are not mechanically fixed in relations to each other; hence, the calibration process allows the image capturing unit 120 to accurately capture light reflected from the reference plane 620. For example, the calibration process presents an image on the display device and prompts a user to focus or reposition the image capturing unit 120 based on the displayed image.

Based on images including light reflected from the reference plane 620 by the pointer 630, the image processing unit 130 determines a position of the pointer 630 within the reference plane 620 or determines a trajectory of the pointer 630 within the reference plane 620. For example, based on positions of light reflected from the reference plane 620 by the pointer 630 at different times from images captured by the image capturing unit 120 at different times, the image processing unit 130 and determines a trajectory of the pointer 630 within the reference plane 620 based on the determined positions. Based on the determined position or trajectory of the pointer 630, the image processing unit 130 determines a touch signal. Hence, the image processing unit 130 determines a touch signal corresponding to the determined position or trajectory of the pointer 630.

In some embodiments, the image processing unit 130 also accounts for image data presented by the display surface 150 as well as the determined position or trajectory of the pointer 630 to determine the touch signal. In some embodiments, the image processing unit 130 determines a touch signal corresponding to a determined position of the pointer 630 in the reference plane as well as a portion of an image displayed by portion of the display surface 150 in a portion of a plane parallel to (e.g., below) the determined position of the pointer 630 in the reference plane 620. For example, if a portion of the display surface 150 presents an interface element (e.g., an image, an icon, a menu option) to present a menu and the image processing unit 130 determines the pointer 630 is in a position of the reference plane 620 above the portion of the display surface 150 presenting the interface element, the image processing unit 130 determines the touch signal corresponding to the position of the pointer 630 is accessing the presented interface element. As described above in conjunction with FIG. 1, the image processing unit 130 communicates the touch signal to the processing unit 140, which performs an operation corresponding to the touch signal. For example, the processing unit 140 is a device executing an operating system, such as ANDROID™ that associates operations with touch signals.

The reference plane generation unit 610 may be attached to a projection screen, monitor, or other display device using a support, such as the support described above in conjunction with FIG. 3. Additionally, the projector described above in conjunction with FIG. 5 may capture reflected light from a reference plane projected by the reference plane generation unit 610 parallel to a projection screen and determine touch signals based on the reflected light as described above. In some embodiments, either a light-spot emitting unit 110 or a pointer 630 may be used to interact with image data presented on the display surface 150, with an image processing unit 120 capable of identifying a position or a trajectory of either the light spot 160 or the pointer 630 as described above.

In summary, the photoelectric touch assemblies described herein allow image data to be viewed by a display surface and operations associated with touch signals to be performed based on interactions with the display surface or with a reference plane parallel to the display surface. Therefore, any type of display device, including television sets, monitors, and projectors, may be augmented with a photoelectric touch assembly to provide touch-sensitive functionality without modifying manufacturing of the display device itself. Using the a photoelectric touch assembly as described herein in conjunction with a display device allows a user to quickly and cheaply increase the functionality of the display device and simplify certain interactions with content presented by the display device.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for performing one or more operations based on interaction with image data presented on a display surface comprising:

a reference plane generating unit configured to project a reference plane of light parallel to the display surface on which frames of image data are displayed, the reference plane positioned within a threshold distance of the display surface and detachably coupled to a display device including the display surface;

an image capturing unit positioned so the display surface and the reference plane are within a field of view of the image capturing unit, the image capturing unit configured to capture images including light reflected from the reference plane by a pointer breaking the reference plane of light, the image capturing unit detachably coupled to a foldable support that is also coupled to the display device including the display surface;

an image processing unit configured to store data associating different positions and trajectories of light reflected from the reference plane with different touch signals, to determine a position in the reference plane of the pointer and a trajectory of the pointer in the reference plane from the images captured by the image capturing unit including light reflected from the reference plane by the pointer, and to determine a stored touch signal associated with a position and a trajectory matching the determined position and trajectory of the pointer in the reference plane; and a processing unit configured to maintain stored data associating touch signals with commands, to receive the touch signal from the image processing unit, to retrieve a command associated with the touch signal from the image processing unit, and to communicate a display signal execute the retrieved command.

2. The system of claim 1, wherein the reference plane generating unit comprises a coherent light source projecting light onto a diffractive optical element that projects the reference plane of light.

3. The system of claim 2, wherein the coherent light source is a laser.

4. The method of claim 2, wherein the diffractive optical element is a lens.

5. The system of claim 1, wherein the reference plane of light is in an infrared wavelength.

6. The system of claim 1, wherein the display surface is a monitor.

7. The system of claim 1, wherein the display surface is a projection screen.

8. The system of claim 1, wherein the image processing unit is configured to determine the touch signal corresponding to the determined position in the reference plane based at least in part on image data presented by a portion of the display surface in a plane parallel to the determined position in the reference plane.

9. The system of claim 1, wherein the pointer comprises a stylus.

10. The system of claim 1, wherein the image capturing unit comprises an infrared camera.

11. The system of claim 1, wherein a width of the reference plane equals or exceeds a width of the display surface and a length of the reference plane equals or exceeds a length of the reference plane.

12. The system of claim 1, wherein the image capturing unit is further configured to capture a series of images including light reflected from the reference plane by the pointer breaking the reference plane of light at different times.

13. The system of claim 12, wherein the image processing unit determines the trajectory of the pointer within the reference plane based on the series of images including light reflected from the reference plane by the pointer breaking the reference plane of light at different times.

14. A method for performing one or more operations based on interaction with image data presented on a display surface comprising:
  maintaining stored data associating touch signals with commands and associating different touch signals with different positions and trajectories of light reflected from a reference plane;
  projecting the reference plane of light parallel to the display surface on which frame of image date, the reference plane positioned within a threshold distance of the display surface;
  capturing images of the reference plane at different times by an image capturing unit detachably coupled to a foldable support that is also coupled to a display device including the display surface, each image including light reflected from the reference plane by a pointer breaking the reference plane of light;
  determining a position of the pointer in the reference plane and a trajectory of the pointer in the reference plane based on the images including the light reflected from the reference plane;
  determining a touch signal associated with a position and a trajectory matching the determined position and trajectory of the pointer in the reference plane from the stored data;
  retrieving a command associated with the determined touch signal from the stored data; and
  executing the retrieved command associated with the determined touch signal to perform an operation corresponding to the determined touch signal.

15. The method of claim 14, wherein determining the position of the pointer in the reference plane and the trajectory of the pointer in the reference plane based on the images including the light reflected from the reference plane comprises:
  determining a trajectory of the pointer within the reference plane based on positions of the pointer in the reference plane in images including light reflected from the reference plane by the pointer at different times.

* * * * *

UNITED STATES PATENT AND TRADEMARK OFFICE
CERTIFICATE OF CORRECTION

PATENT NO. : 10,185,445 B2  
APPLICATION NO. : 14/723088  
DATED : January 22, 2019  
INVENTOR(S) : Jiang Li et al.

Page 1 of 1

It is certified that error appears in the above-identified patent and that said Letters Patent is hereby corrected as shown below:

On the Title Page

Column 2, Abstract (57), Line 5, delete "such a stylus" and insert --such as a stylus--

In the Claims

Column 13, Line 5, delete "execute" and insert --executing--

Signed and Sealed this  
Twenty-eighth Day of January, 2020

Andrei Iancu  
*Director of the United States Patent and Trademark Office*